US006257621B1

(12) United States Patent
Smith

(10) Patent No.: US 6,257,621 B1
(45) **Date of Patent: *Jul. 10, 2001**

(54) ACCESSORY KIT AND/OR ASSEMBLY FOR A SCRAPBOOK, PHOTO ALBUM OR THE LIKE

(75) Inventor: Paul A. Smith, Glenview, IL (US)

(73) Assignee: Eversharp Pen Company, Franklin Park, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,315

(22) Filed: Nov. 3, 1998

(51) Int. Cl.[7] .............................. B42D 1/06; B42D 3/18; G09B 1/02; B65D 85/672

(52) U.S. Cl. ............................ 281/15.1; 281/29; 281/31; 281/36; 281/37; 281/38; 281/39; 281/51; 283/64; 402/70; 402/73; 402/80 R

(58) Field of Search ................................ 281/29, 31, 36, 281/37, 38, 39, 51, 15.1; 283/64; 402/70, 73, 80 R

(56) References Cited

U.S. PATENT DOCUMENTS

| | | | | |
|---|---|---|---|---|
| 3,140,883 | * | 7/1964 | Anthony | 350/452 |
| 4,002,355 | * | 1/1977 | Sendor | 281/29 |
| 4,255,872 | * | 3/1981 | Williams, Sr. | 281/31 |
| 5,772,247 | * | 6/1998 | Legrand | 281/31 |

OTHER PUBLICATIONS

One page from the Norm Thompson catalog showing Item B: Rolodex Datapage.

* cited by examiner

*Primary Examiner*—A. L. Wellington
*Assistant Examiner*—Mark T. Henderson
(74) *Attorney, Agent, or Firm*—Patents+TMS

(57) ABSTRACT

A kit and assembly are provided for organizing, viewing and locating photographs, for example, on pages of a photo album or scrap book. The kit or assembly may include a camera, a recorder, a digital organizer, a pen or pens, a mounting device, scissor and/or a stamp pad or the like. In addition, the kit or assembly may incorporate a magnifying sheet to assist in viewing the content of the pages of the photo album or scrap book.

6 Claims, 2 Drawing Sheets

ACCESSORY KIT AND/OR ASSEMBLY FOR A SCRAPBOOK, PHOTO ALBUM OR THE LIKE

BACKGROUND OF THE INVENTION

The present invention generally relates to an accessory kit for organizing a specific group of related items. More specifically, the present invention relates to an organizing kit specifically for a photo album, scrap book, or the like with the necessary accessories for organizing and maintaining the same.

It is, of course, generally known to provide a photo album for displaying, for example, pictures or other items that are generally flat in nature. Such organization and assembly often requires many components, tools, fastening means, and other items to complete the assembly. Often these components are stored in various locations within, for example, an individual's home. Many photo albums and scrap books require mounts or special adhesives for attaching the photos or other items to the pages of the book. Likewise, other photo albums and books are known which have sheets that are removably attached to each of the pages. The pictures or items to be mounted on the page lay between the removable sheet and the page of the photo album.

More recently, photo albums and scrap books have become more artistic and creative in nature including use of colored pages, such as black. The pages are typically heavier weight construction-type paper. Often, individuals secure their photos or other items and then place their own written notes or the like on those pages to create a story book type album of personal photos and memorabilia. Such photo albums, however, require either distinctly colored ink that will be visible on the colored pages of the photo album or the use of stickers or the like for placement on the pages.

After the books are assembled, it is often difficult to locate the pictures organized therein. In addition, some pictures are often difficult to view without the use of, a magnifying glass, or the like, particularly by the elderly or individuals having vision problems.

A need, therefore, exists for an improved kit or assembly for organizing and assembling photos and/or other items and simplifying the organization and the ability to locate photos after the same are organized. Furthermore, a need exists for improving the ability to view the photographs following their organization.

SUMMARY OF THE INVENTION

The present invention provides an assembly and a kit including a photo album with pages for mounting photos and/or other items and the necessary components for organizing, displaying, and subsequently viewing and locating those photos.

To this end, in an embodiment, the present invention provides an assembly. The assembly has a front cover and a back cover connected along one side of each cover to pivot with respect to one another. A plurality of pages is connected between the front cover and the back cover. A plurality of compartments is formed in the back cover wherein each of the plurality of compartments contains at least one component necessary for display and organization of the plurality of pages.

In an embodiment, at least one of the components is a camera.

In an embodiment, at least one of the components is a recorder.

In an embodiment, at least one of the components is a digital organizer.

In an embodiment, at least one of the components is a pen.

In an embodiment, at least one of the components is a mounting device.

In an embodiment, at least one of the components is scissors.

In an embodiment, at least one of the components is a stamp pad.

In an embodiment, a magnifying sheet is attached to the back cover.

In an embodiment, a plurality of grooves are provided on the back cover slidably attached to the magnifying sheet to allow adjustment in height of the magnifying sheet.

In another embodiment of the present invention, a kit is provided. The kit has a container having a base having a plurality of compartments and further has a cover attached to the base wherein the cover encloses the base and the plurality of compartments. A book has a plurality of pages in one of the plurality of compartments in the base of the container. A plurality of compartments necessary for display and organization of the book is provided wherein each of the plurality of compartments of the container includes at least one of the plurality of components therein.

In an embodiment, one of the plurality of components is a camera.

In an embodiment, one of the plurality of components is a recorder.

In an embodiment, one of the plurality of components is a digital organizer.

In an embodiment, one of the plurality of components is a pen.

In an embodiment, one of the plurality of components is a mounting device.

In an embodiment, one of the plurality of components is scissors.

In an embodiment, one of the plurality of components is a stamp pad.

In an embodiment, a magnifying sheet is attached to the container.

It is, therefore, an advantage of the present invention to provide an assembly and a kit for organizing and displaying photographs.

Another advantage to the present invention is to provide an assembly and a kit for assisting in locating, for example, photographs.

Yet another advantage of the present invention is to provide an assembly and a kit that assists in viewing photographs following assembly and organization of the same in, for example, a photo album or scrapbook.

A still further advantage is to provide an assembly and a kit including all necessary components for taking photographs, organizing the photographs following processing, and viewing and locating those photographs.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides a kit or assembly for assembling, organizing, locating and viewing, for example, photographs or other like articles for display, organization and viewing of the same.

Figure 1:
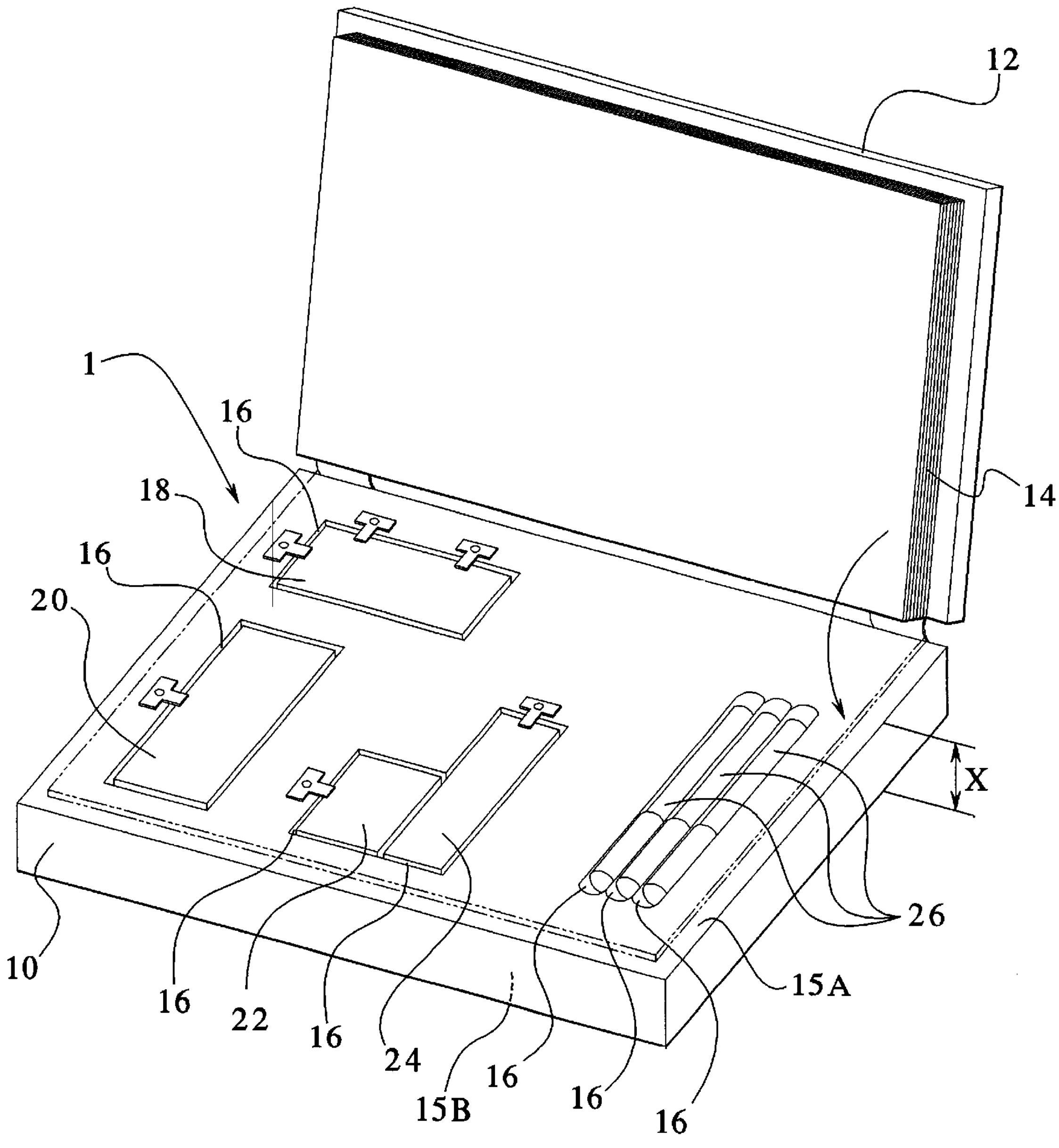
FIG. 1 generally illustrates a perspective view of a kit for organizing, for example, photographs or the like in an embodiment of the present invention.

Referring now to the drawings wherein like numerals refer to like parts, FIG. 1 illustrates an embodiment of an assembly 1. The assembly 1 includes a back cover 10, a front cover 12 and a plurality of pages 14. The back cover 10 has a top surface 15A and a bottom surface 15B parallel to and displaced from each other forming a depth X. The top surface 15A includes a plurality of opening forming compartments 16 of various sizes, shapes and construction in the depth X formed in the back cover 10 between the top surface 15A and the bottom surface 15B. It should be understood that any number of compartments 16 may be provided in the embodiment illustrated in FIG. 1, and the compartments 16 may be adapted to contain and hold therein a variety of components that may be implemented for use of the assembly 1 to be described hereinafter.

As generally shown, in one of the compartments, a camera 18 may be provided. In another one of the compartments, a recorder 20, such as a micro-cassette recorder, may be provided. Still further, in a further compartment, photo mounting devices 22 may be provided along with, for example, a glue stick 24 and or fastening tape or the like. The photo mounting device 22 may be, for example, mounting corners having adhesive backs for attaching to the pages 14 of the assembly 1. In a further compartment, pens 26 or other marking devices may be provided.

In addition to the foregoing, or alternatively, other compartments may be provided to incorporate, for example, an organizer, such as a digital index organizer, scissors, die cuts, decorative stickers, a stamp pad or the like. The combination of components in the compartments is not critical to the present invention as that combination may be changed as desired and may be manufactured accordingly for the particular desired usage of the assembly 1.

Preferably, the camera 18 is removably incorporated into one of the compartments 16 for taking pictures for display, for example, on the pages 14 of the assembly 1 after processing the same. Preferably, the pages 14 are constructed from, for example, construction paper or any other slightly heavier weight paper and, preferably colored paper, such as black. The pens 26 provided in the compartment 16 of the back cover 10 are preferably pens capable of writing on colored paper and distinguishing the paper from the color of the ink in the pen. Such ink in the pens 26 is typically silver, gold, white or the like, for distinct and/or decorative marking on, for example, colored black pages of the assembly 1.

Further, in a preferred embodiment, one compartment may include the recorder 20 which may be used to record a voice. The recorder 20 may be used to describe events or other significant details regarding the photographs that have been taken or items displayed on the pages 14 of the assembly 10. Still further, one of the compartments 16 may include a digital index organizer capable of inputting names, addresses, phone numbers and other like information or descriptive information related to the photographs or other items displayed on the pages 14 of the assembly 1. The digital organizer includes, for example, a display, a keyboard system for entry of data and the like. Such organizers are generally known and available for entry of data. However, the organizer of the present invention may be specifically programmed to enter and to search for data regarding, for example, page number and article content of the pictures or articles displayed, for example, on the pages 14 of the assembly 1.

Although the present invention as illustrated in FIG. 1 is shown with the compartments in the back cover 10, the front cover 12 may also be used instead of or in addition to the back cover 10 for additional compartments, or in place of the compartments of the back cover 10.

Figure 2:
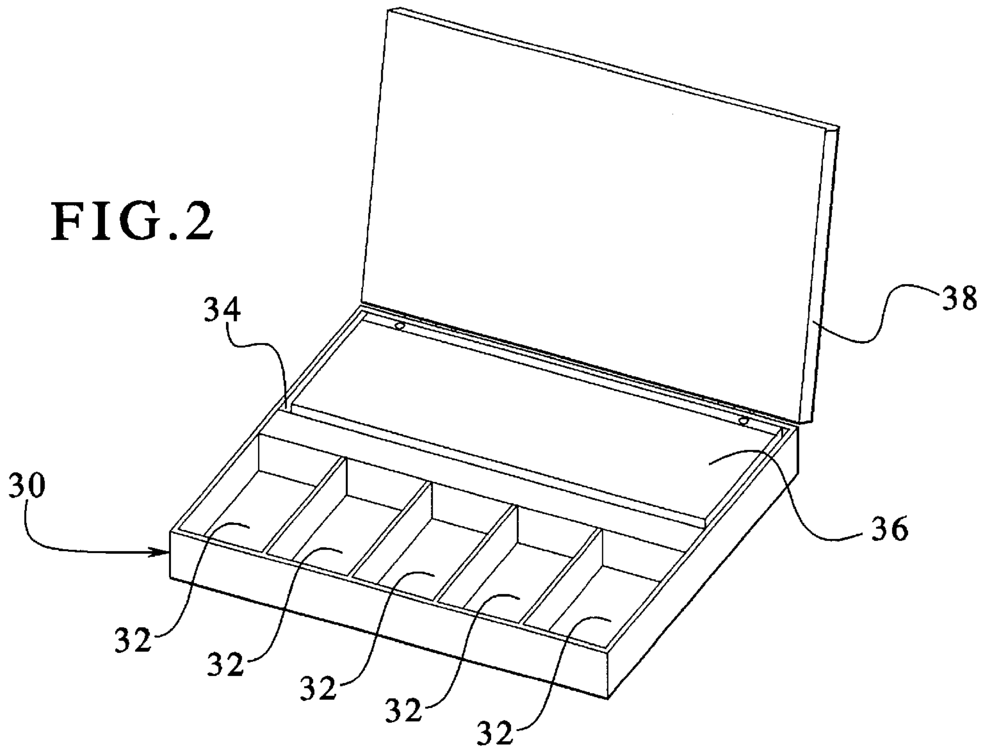
FIG. 2 illustrates a perspective view of a kit for organizing and displaying photographs or the like in an embodiment of the present invention.

Referring now to FIG. 2, another embodiment of the present invention is generally illustrated. In the embodiment illustrated, a container 30 having a plurality of compartments 32 is provided for holding the components generally illustrated and shown in the back cover 10 of the embodiment illustrated in FIG. 1. Although the compartments 32 as shown in FIG. 2 are substantially equal in size, any size compartment may be provided and may be customized and/or molded for the particular components stored therein. Another compartment 34 is provided containing, for example, a photo album 36 or scrap book therein. The container 30 further includes a cover 38 hinged or otherwise attached to a base of the container 30 that includes the compartments 32 and 34 and the photo album 36 or scrap book.

Figure 3:
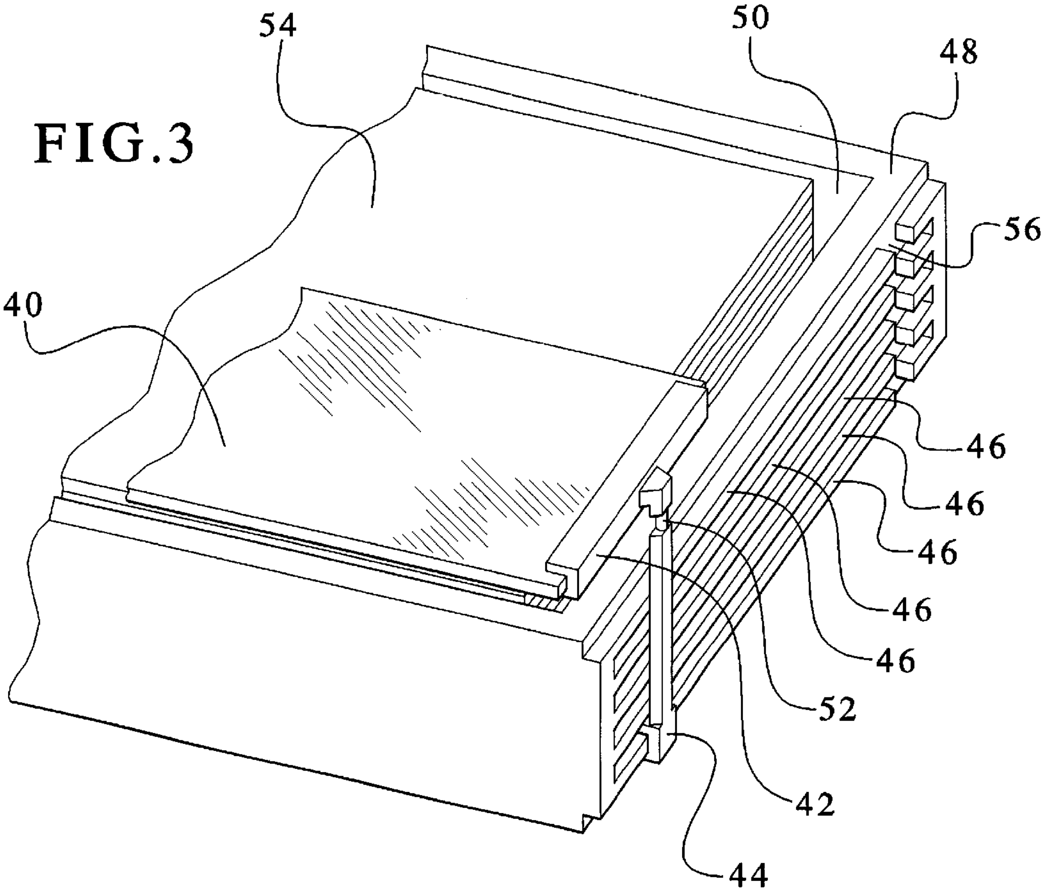
FIG. 3 illustrates a perspective view of a grooved side and attached sheet for magnifying photographs or other items mounted on pages of, for example, a photo album or scrapbook in an embodiment of the present invention.

Referring now to FIG. 3, an embodiment of the present invention is illustrated that incorporates a magnifying sheet 40 attached to a bracket 42 which, in turn, is attached to an arm 44. The sheet 40 is movable along grooved tracks 46 on one end of a container 48 incorporating the tracks 46. The tracks 46 on the side of the container 48 may be incorporated into either the bottom cover 10 of the assembly 1 of FIG. 1 or the container 30 of FIG. 2. As a result, the height of the magnifying sheet 40 with respect to the container 48 may be altered. The arm 44 and the bracket 42 are connected at a pivoting point 52 such that the magnifying sheet 40 may be rotated.

A photo album or scrapbook 54 is provided in an interior 50 of the container 48. The magnifying sheet 40 may be rotated about the pivoting point 52 to avoid interference when the pages of the photo album or scrapbook 54 or when the magnifying sheet is not necessary for use in visualizing items mounted to the pages of the photo album or scrapbook 54.

As a result of the construction of the container 48, the book 54 may be provided within the container 48 and viewing of the pages may be assisted by use of the magnifying sheet 40. The height 40 may be altered depending on the required magnification or the page being viewed by moving the arm 44 along any one of the grooves 46 to a point such as that generally designated at 56 wherein the grooved track 46 has an opening allowing for the arm to be moved to one of the grooved tracks 46 at a different level.

The type of magnifying sheet 40 that may be implemented is constructed to be generally stiff in nature, but may also be semi-pliant. Such magnifying sheets 40 are generally known and available in the art and may be incorporated by one having ordinary skill in the art.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An assembly comprising:

a front cover and a back cover connected along one side of each cover to pivot with respect to one another;

a plurality of pages connected between the front cover and the back cover;

a plurality of compartments formed in the back cover wherein each of the plurality of compartments contains at least one component necessary for display and organization of the plurality of pages;

a magnifying sheet attached to the back cover; and a plurality of grooves on the back cover slidably attached to the magnifying sheet to allow adjustment in height of the magnifying sheet.

2. A kit comprising:

a container having a base having a plurality of compartments and further having a cover attached to the base wherein the cover encloses the base and the plurality of compartments;

a book having a plurality of pages in one of the plurality of compartments in the base of the container;

a plurality of components necessary for display and organization of the book wherein each of the plurality of compartments of the container includes at least one of the plurality of components therein; and a magnifying sheet attached to the container.

3. An assembly comprising:

a front cover and a back cover connected along one side of each cover to pivot with respect to one another wherein the back cover has a top surface;

a plurality of pages connected between the front cover and the back cover;

a plurality of compartments formed in the back cover wherein each of the plurality of compartments has an opening and further wherein the openings are covered when the front cover is closed over the back cover and further wherein each of the plurality of compartments contains at least one component necessary for display and organization of the plurality of pages and further wherein the front cover holds each component within its respective compartment when the front cover is closed over the back cover; and a plurality of grooves provided on the back cover slidably attached to the magnifying sheet to allow adjustment in height of the magnifying sheet.

4. A kit comprising:

a container having a base having a plurality of wherein each of the plurality of compartments has an opening compartments and further having a cover attached to the base wherein the cover encloses the base and the plurality of compartments and further wherein the openings are covered when the cover is closed over the base;

a book having a plurality of pages in one of the plurality of compartments in the base of the container; and a plurality of components necessary for display and organization of the book wherein each of the plurality of compartments of the container includes at least one of the plurality of components therein and further wherein the front cover holds the components within the compartments when the front cover is closed over the base; and a magnifying sheet attached to the container.

5. An assembly comprising:

a front cover and a back cover connected along one side of each cover to pivot with respect to one another;

a top surface of the back cover and a bottom surface of the back cover parallel to and displaced from one another forming a depth between the top surface and the bottom surface of the back cover;

a plurality of blank pages devoid of printed matter or marks on the pages wherein the pages are connected between the front cover and the back cover; and a plurality of compartments formed by openings in the top surface wherein the plurality of compartments extend from the openings in the top surface to the bottom surface of the back cover wherein each of the plurality of compartments has an opening and further wherein the openings are covered when the front cover is closed over the back cover and further wherein each of the plurality of compartments contains at least one component wherein each of the at least one components is implemented to fill the plurality of blank pages with information for display and further wherein the front cover holds each component within its respective compartment when the front cover is closed over the back cover; and a plurality of grooves provided on the back cover slidably attached to the magnifying sheet to allow adjustment in height of the magnifying sheet.

6. A kit comprising:

a container having a base wherein the base has a top surface and a bottom surface parallel to and displaced from one another forming a depth between the top surface and the bottom surface and further wherein the base has a plurality of compartments formed by openings wherein the plurality of compartments extend from the openings in the top surface to the bottom surface of the base and still further wherein the container has a cover attached to the base wherein the cover encloses the base and the plurality of compartments and further wherein the openings are covered when the cover is closed over the base;

a book having a plurality of blank pages devoid of printed matter or marks on the pages wherein the pages are connected between the cover and the base; and a plurality of components wherein at least one of the plurality of components is implemented to fill the plurality of blank pages with information for display and organization of the book wherein each of the plurality of compartments of the container includes at least one of the plurality of components therein and further wherein the front cover holds the components within the compartments when the front cover is closed over the base; and a magnifying sheet attached to the container.

* * * * *